United States Patent [19]

Monroe

[11] Patent Number: 4,875,700

[45] Date of Patent: Oct. 24, 1989

[54] BOAT TRAILERS

[75] Inventor: George E. Monroe, Pinconning, Mich.

[73] Assignee: Magline, Inc., Pinconning, Mich.

[21] Appl. No.: 200,544

[22] Filed: May 31, 1988

[51] Int. Cl.[4] .............................................. B60D 3/10
[52] U.S. Cl. ................................. 280/414.1; 414/534; 414/535
[58] Field of Search ...................... 280/414.1; 414/529, 414/530, 531, 532, 533, 534, 535, 536

[56] References Cited

U.S. PATENT DOCUMENTS

| | | | |
|---|---|---|---|
| 414,169 | 10/1889 | Reuschel | 403/232.1 |
| 2,816,672 | 12/1957 | Facchini | 414/534 |
| 2,860,792 | 11/1958 | Nelson et al. | 414/535 |
| 3,029,960 | 4/1962 | Evans | 414/534 |
| 3,104,770 | 9/1963 | Calkins et al. | 414/531 |
| 3,155,249 | 11/1964 | Johnson | 414/534 |
| 3,160,297 | 12/1964 | Stumvoll | 414/532 |
| 3,408,975 | 11/1968 | Gamble | 440/40 |
| 3,756,439 | 9/1973 | Johnson | 414/534 |
| 3,785,677 | 1/1974 | Calkins | 280/414.1 |
| 3,888,367 | 6/1975 | Cox | 414/534 |
| 3,892,320 | 7/1975 | Moore | 414/534 |
| 3,917,087 | 11/1975 | Godbersen | 280/414.1 X |
| 3,974,924 | 8/1976 | Ullman | 414/531 |
| 4,278,388 | 7/1981 | Johnson | 280/414.1 X |
| 4,331,346 | 5/1982 | Walters | 280/414.1 |
| 4,448,438 | 5/1984 | DeWalk | 280/414.1 |
| 4,530,634 | 7/1985 | Johnson | 414/534 |
| 4,592,694 | 6/1986 | Johnson | 414/534 |

*Primary Examiner*—Mitchell J. Hill
*Attorney, Agent, or Firm*—Learman & McCulloch

[57] ABSTRACT

A boat trailer frame has front cross rails spanning the parallel portions of longitudinal rails with forwardly convergent front ends. The cross rails carry sets of boat hull-engaging members arranged to conform to the shape of the hulls of boats to be transported. Transversely extending pivots, in hanger cradles carried by longitudinally adjustable hangers depending from the longitudinal rails, mount the ends of the cross rails for pivoting movement in a fore and aft direction and pivot restricting stops interact between the hangers and cross rails to limit the arc of fore and aft pivot thereof.

9 Claims, 1 Drawing Sheet

BOAT TRAILERS

BACKGROUND OF THE INVENTION

The present invention is concerned with boat trailers of the type used to support and transport recreational boats and cruisers, and more particularly to a trailer having improved frame structure characteristics which permit the trailer to be readily and rapidly prefitted to the boat to be transported in a manner to provide a precise boat-trailer match-up. This matching of the trailer supports, whether of the bunk and roller combination or the all roller style, to the hull configuration, greatly enhances the safety with which the boats can be loaded to, and off-loaded from, the trailer, and with which they are transported.

While, in the past, boat trailers have provided cross frame supports for rigidly connecting the side booms of the trailer frame, and have provided for some pivot of the cross members, and while cross members have also been longitudinally movable to predetermined locations on the side rail or boom members, via the expedient of providing a series of bolt openings, for instance, on the side booms to which the cross rail members could be selectively attached, it has not been possible, in boat trailer frame structures with which I am familiar, to achieve precise longitudinal movement of the boat hull supporting cross frame members, while still providing the pivoting action required.

SUMMARY OF THE INVENTION

One of the prime objects of the present invention is to design a trailer frame of the type which facilitates boat and trailer match-up, both at the point of manufacturing to greatly reduce the time dealers need for trailer conformance and, later, in a final tuning by the dealer.

Another object of the invention is to provide a trailer which provides for the movement of the cross members on the longitudinal side rails to optimum positions for supporting particular hull configurations which are not predetermined by the spacing and number of holes drilled in the side rails, while, at the same time, providing for easy tilting of the cross members to permit an easier angle of boat entry onto the trailer.

Another object of the invention is to provide a boat trailer which can readily place the hull supporting cross members in the safest position for securely supporting a particular boat hull. The system to be described can provide a stable support for the boat hull which will avoid damage to the boat hull when the boat is being loaded and off-loaded at the ramp, as well as when it is being transported and is subject to road shocks.

Still another object of the invention is to provide a boat trailer of the character described which can utilize dropped cross bars, and so maintain a lower center of gravity for better control and less sway when towing, as well as facilitating the ease with which the boat is loaded and unloaded.

Still another object of the invention is to provide a boat trailer support system providing an improved method of supporting the hull-engaging members on the cross rails in a manner to permit their ready adjustment thereon to an optimum position for supporting a particular hull configuration.

A trailer of the present construction includes transversely spaced, longitudinally parallel rail sections, with convergent front portions forming a tongue, and cross rails spanning the wheel supported parallel sections carrying sets of boat hull-engaging members. Hangers are mounted on the parallel rail sections and are slidable longitudinally thereon to positions in which they may be releasably secured. Pivots carried by the hangers mount the ends of the cross rails for pivoting movement relative to the parallel rail sections.

Other objects and advantages of the invention will be pointed out specifically or will become apparent from the following description when it is considered in conjunction with the appended claims and the accompanying drawings.

IN THE DRAWINGS

Figure 1:
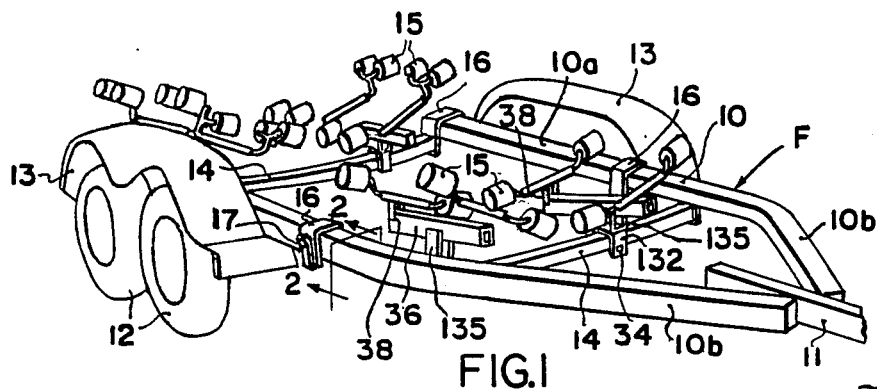
FIG. 1 is a somewhat schematic, fragmentary, perspective elevational view of a boat trailer which incorporates the improvements to be described.
Figure 2:
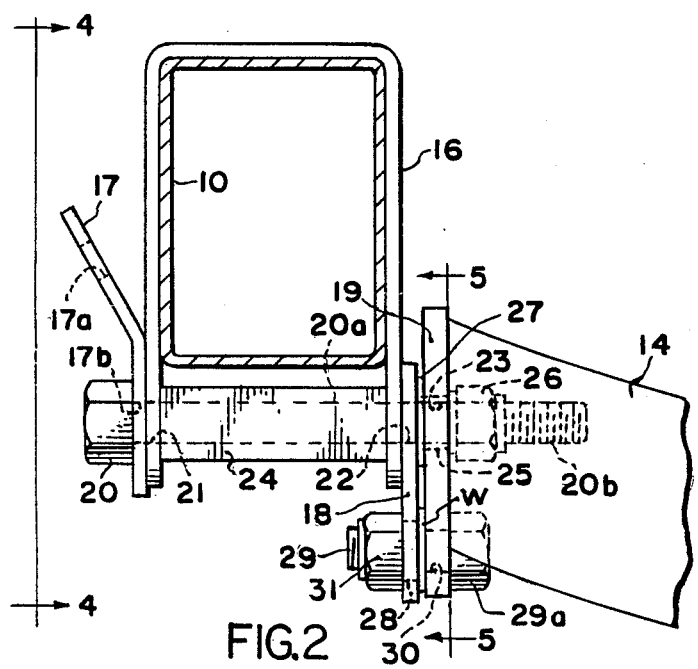
FIG. 2 is an enlarged, transverse, sectional view, taken on the line 2—2 of FIG. 1.

Referring now more particularly to the accompanying drawings, the improved boat trailer of the present invention comprises a frame, generally designated F, with spaced apart, elongated side rails or booms 10, which include transversely spaced apart, parallel rear portions 10a, and convergent front portions 10b which rigidly join to a tongue 11, which has the usual socket or the like facilitating its attachment to a trailer hitch part, such as the ball joints which are conventionally mounted on the rear ends of automobiles, vans and other towing vehicles. The rear end of frame F is supported via the usual leaf spring system, or the like, by rear wheels 12, and it will be seen that the frame F supports fender members 13 for the wheels 12 in the usual manner.

The parallel portions 10a of the pair of longitudinal rails 10, support a pair of downwardly curved, longitudinally spaced cross rails 14, and the rails 14 support the boat hull-engaging members which, in this case, comprise rollers 15, in a manner which presently will be more particularly described. The rear cross member 14 could, of course, alternatively support bunks which cooperated with the rollers 15 on the front cross-member 14.

As FIGS. 2 and 4–6 particularly illustrate, each end of each of the cross members 14 connects to the portions 10a of the longitudinal rail members 10 in a manner to permit tilting, while at the same time providing for precise longitudinal movement to any selected position on the tubular rail sections 10a. Thus, the cross members 14 may be secured in the optimum position on the side rail portions 10a, while still having the capability of tilting in a longitudinal direction to accommodate to the configuration of the boat hull to be loaded to the trailer, and off-loaded therefrom.

As the figures indicate, the mount structure for the ends of the cross rails 14 include, at each end of each rail 14, an inversely disposed U-shaped hanger strap 16. Welded to each strap 16 is a bar tie-down 17, with an opening 17a, for reception of a tie hook. Also welded to strap 16, is an inner plate or plate portion 18 which depends below the strap 16. A similar plate or plate portion 19 is welded to each end of each of the tubular cross members 14, in confronting relationship with the plate 18.

A pivot means in the form of bolt 20 extends through the opening 17b in each tie-down bar 17, and an opening 21 in the hanger strap 16 at a location spaced below the longitudinal rails 10. The elongate bolts 20 further extend through openings 22 provided in plates 18, and openings 23 provided in plates 19.

Fixed in position between the legs of straps 16 by welding, or the like, are cradle members 24. As FIG. 4 particularly indicates, cradle members 24, which are generally channel-shaped, have end walls 24a which engage and bear on the inner surfaces of the strap 16. The members 24 also have upstanding inwardly curved legs or walls 24b, which form sockets 24c for the bolts 20. The space 24d between legs 24b is sufficiently reduced to trap the shank portion 20a of bolt 20, which extends on through openings 22 and 23, and is threaded only at its inner end as at 20b. Like the walls 24a, the socket arms 24b extend continuously between the legs of hanger 16 to engage the inner surfaces thereof and provide the rigid bearing support for the bolts 20 which is required.

Provided to rotatably support the inner end of each bolt 20, is a bushing 25, secured by a clamp nut 26. Washers 27 are provided on the bolts 20 between the plates 18 and 19, inasmuch as the plates 19 pivot with respect to the plates 18 to a permitted degree.

Figure 4:
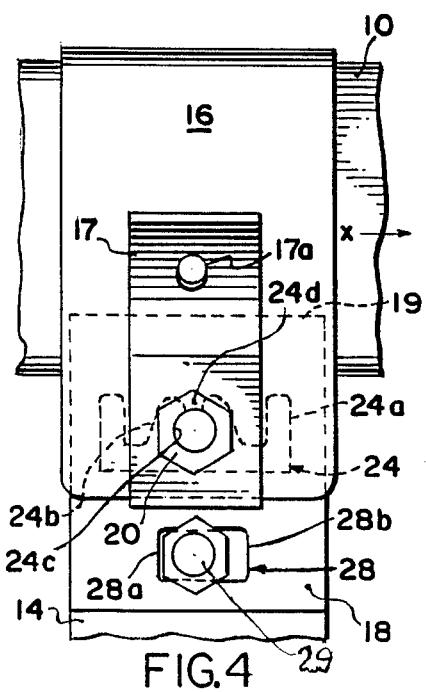
FIG. 4 is a fragmentary, side elevational view, taken on the line 4—4 of FIG. 2.
Figure 5:
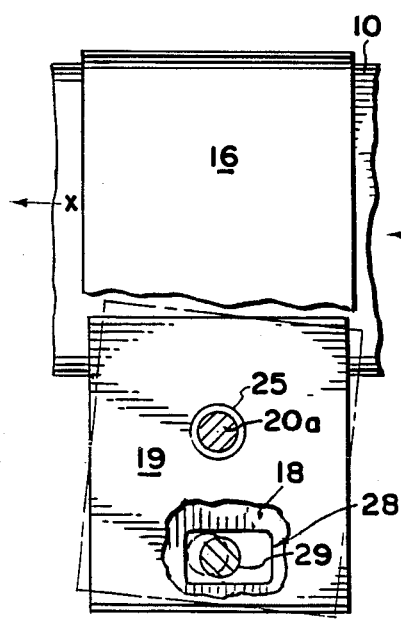
FIG. 5 is a transverse, sectional view, taken on the line 5—5 of FIG. 2, and showing the cross rail in one position of tilt, the chain lines indicating the most extreme position of tilt of the cross rail in one direction.
Figure 6:
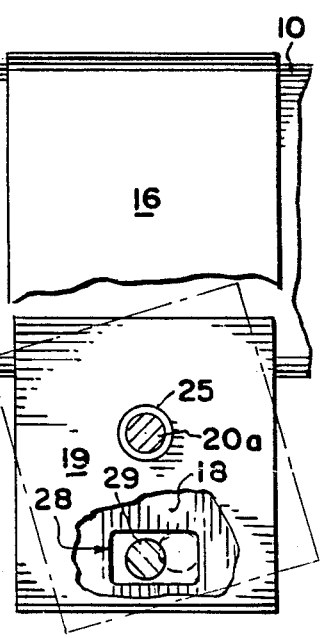
FIG. 6 is a view similar to FIG. 5, with the chain lines indicating the most extreme position of tilt of the cross rail in the opposite direction.

As FIGS. 4–6 point out, each of the plates 18 has an elongate, rectangular-shaped slot 28, which is greater vertically, as well as horizontally, than required to accommodate the shank 29 of a bolt 29a which extends from the inner side of each plate 19 through an opening 30 therein, and is secured by a nut 31. As previously, a washer W is provided on each of the shanks 29 between the plate members 18 and 19.

In the non-tilted position of cross members 14, it will be noted that bolt shanks 29 are off center, or eccentric with respect to the marginal side walls 28a and 28b of the elongate openings 28 in plates 18 through which they extend. With the front of the trailer being located to the right in FIG. 4, in the direction of arrow x, it will be seen that a greater degree of tilt of cross rail 14 is possible in the rearward direction than the forward direction. As FIGS. 5 and 6 point out, the tilt of cross bar 14 in an "up" position forwardly, is about 5 degrees, but is about 17 downwardly in a rearward tilt position.

Figure 3A:
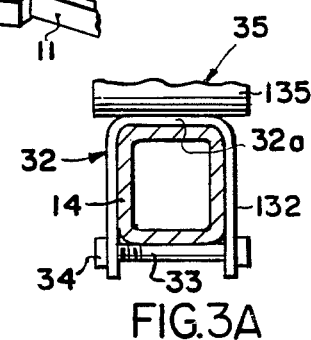
FIG. 3A is a transverse, sectional view, taken on the line 3A—3A of FIG. 3.
Figure 3:
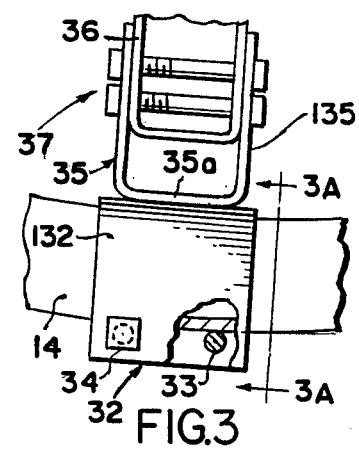
FIG. 3 is an enlarged, fragmentary view, illustrating the manner in which the boat-engaging elements are supported the on cross rails.

As FIGS. 3A and 3 well demonstrate, the rollers 15 and roller support members to be described, are supported at each side of each cross rail 14 on U-shaped hanger straps or bases 32 having cross rail enveloping legs 132 by bolts 33 and nuts 34. Fixed by welding or otherwise, to the web 32a of each of the straps 32 is an inversely disposed U-shaped second channel or bracket 35, which is welded to the bracket 32 in a 90° offset position, bracket 35 having legs 135 joined to a web 35a which welds to the web 32a. The legs 132 extend in planes perpendicular to the planes in which legs 135 extend. Longitudinal support rails 36, secured by bolt and nut assemblies 37, in turn support transverse arms 38, and it is the U-shaped arms 38 on which the rollers 15 revolvably are supported in a hull-engaging configuration, as shown in FIG. 1.

THE OPERATION

In operation, the cross rails 14, of course, have the same mount structure at each end. Each bolt 20 is a pivot bolt and permits the ready tilt of the adjacent plate 19 with respect to the plate 18 without binding in any given position of the hanger straps 16 on the longitudinal side rail portions 10a.

To move the hanger straps 16 longitudinally, without affecting the capacity of the cross rails 14 to tilt, it is merely necessary to back off the nut 26 at each end of the cross rail and slide the hanger strap 16 at each end along the rail 10 on which it is supported. The plates 19 are pivotal within the confines of slots 28, to provide a forward 5° tilt, and a rearward 17° tilt during loading and off-loading and the cradles 24 provide the stability for the considerable weight of the boat. Once the boat is loaded, its weight maintains the tilted position assumed. Brackets 32 can be adjusted along cross rails 14 by the simple expedient of loosening the nuts 34 on the bolts 33 and sliding them to the desired position.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. In a boat trailer frame having a tongue with transversely spaced longitudinal frame members having convergent front portions fixed to said tongue and parallel rear portions; wheels supporting the rear portions for travel behind a towing vehicle; and a cross rail spanning said parallel portions and carrying sets of boat hull engaging members arranged to conform to the shape of the hulls of boats to be transported; the improvement wherein:
   a. a longitudinal frame member enveloping hanger is mounted on each longitudinal frame member and is slidable longitudinally thereon when in released condition;
   b. cross rail mounting and hanger securing means for mounting the ends of said cross rail and releasably securing said hangers in a longitudinal position;
   c. said cross rail mounting and hanger securing means including transversely extending pivot means carried by said hangers and mounting said ends of said cross rail for pivoting movement in a fore and aft direction relative to said hangers and longitudinal frame members;
   d. pivot restricting stop means interacts between said hangers and cross rail to limit the arc of fore and aft pivot of said cross rail; and
   e. said stop means comprising a plate fixed to the end of each cross rail; a plate secured to each hanger transversely opposite each plate; and projection and slot means interacting between each of said hanger and stop means plates portions to provide only a predetermined arc of travel.

2. The invention defined in claim 1 wherein said projection and slot means includes projections and slots, and each projection is eccentrically longitudinally disposed in one of said slots when the cross rail is in non-tilted position to provide a greater tilt in the rearward, than the forward, direction.

3. The invention defined in claim 2 wherein said slots are provided in said plates secured to the hangers.

4. The invention defined in claim 2 wherein said hangers comprise U-shaped straps having depending legs spanned by cradles fixed between said legs; said cradles having sockets within which said pivots are accommodated.

5. The invention defined in claim 4 wherein said cradles comprise channel-shaped members with end walls bearing against said legs, and with inwardly curved legs forming sockets for said pivots.

6. The invention defined in claim 5 wherein said pivots are bolts and each of said plates carry bushings for receiving the ends of said bolts; nuts being provided for securing the bolts.

7. The invention defined in claim 2 wherein said projections are axially aligned vertically with said pivots.

8. The invention defined in claim 1 wherein a bracket to carry boat hull engaging members is slidable longitudinally on said cross rail when in released condition, the bracket comprising inversely disposed U-shaped members with webs secured together, the U-shaped members being angularly out of alignment in cross-wise disposition.

9. In a boat trailer frame having a tongue with transversely spaced longitudinal frame members having convergent front portions fixed to said tongue and parallel rear portions; wheels supporting the rear portions for travel behind a towing vehicle; a transversely extending cross rail, having a flat top surface, spanning said parallel portions and carrying boat hull engaging parts arranged to conform to the shape of the hulls of boats to be transported; the improvement wherein:

a. a bracket is mounted on said cross rail to carry said boat hull engaging parts and is slidable longitudinally thereon when in released condition to a position set to support said boat hull;

b. securing means releasably secures said bracket in position;

c. a longitudinally extending support rail carrying said boat hull engaging parts is releasably mounted on said bracket;

d. said bracket comprises a first channel shaped member having legs closely but slidably enveloping said cross rail and having a flat web above and in abutting parallel engagement with the top surface of said cross rail, said legs lying in parallel planes parallel to said cross rail, and a second channel shaped member, inversely disposed relative to, and above said first channel shaped member with its web in abutting engagement with and fixed to the web of said first channel shaped member and its legs enveloping said boat hull engaging parts support rail, the second channel shaped member being crosswisely angularly out of alignment with said first channel shaped member with its said legs lying in plane perpendicular to the planes in which the legs of said first channel shaped member lie; and e. securing means releasably secures said support rail in position on said second channel shaped member.

* * * * *

UNITED STATES PATENT AND TRADEMARK OFFICE
CERTIFICATE OF CORRECTION

PATENT NO. : 4,875,700
DATED : October 24, 1989
INVENTOR(S) : George E. Monroe

It is certified that error appears in the above-identified patent and that said Letters Patent is hereby corrected as shown below:

In column 5, line 9, change "pivots" to -- pivot means --;

line 14, change "pivots" to -- pivot means --; bridging lines 15 and 16, change "piv-ots" to -- pivot means --;

line 20, change "pivots" to -- pivot means --.

In column 6, line 9, after "in" insert -- said --.

Signed and Sealed this

Ninth Day of October, 1990

*Attest:*

HARRY F. MANBECK, JR.

*Attesting Officer*      *Commissioner of Patents and Trademarks*